United States Patent [19]
Lin

[11] Patent Number: 5,799,967
[45] Date of Patent: Sep. 1, 1998

[54] GOLF TROLLEY

[75] Inventor: Liz Lin, San Diego, Calif.

[73] Assignee: Super-Tec Manufacturing, San Diego, Calif.

[21] Appl. No.: 613,314

[22] Filed: Mar. 11, 1996

[51] Int. Cl.[6] .................................................. B62B 1/04
[52] U.S. Cl. .................... 280/646; 280/655; 280/47.26; 280/47.33; 280/DIG. 6
[58] Field of Search ................. 280/DIG. 5, DIG. 6, 280/646, 651, 655.1, 652, 655, 42, 47.17, 47.18, 47.24, 47.26, 47.33; 224/919, 918, 926, 274

[56] References Cited

U.S. PATENT DOCUMENTS

| | | | |
|---|---|---|---|
| 2,760,782 | 8/1956 | Hartzell | 280/36 |
| 2,774,403 | 12/1956 | Williamson | 150/1.5 |
| 2,863,483 | 12/1958 | Fargo | 150/1.5 |
| 2,868,559 | 1/1959 | Vincelette | 280/47.33 |
| 3,096,992 | 7/1963 | Fristsch | 280/47.31 |
| 3,304,036 | 2/1967 | Davis | 248/41 |
| 4,032,054 | 6/1977 | Duncan | 224/29 |
| 4,455,030 | 6/1984 | Rosen | 280/47.19 |
| 4,620,682 | 11/1986 | Yim | 248/96 |
| 4,852,896 | 8/1989 | Mills | 280/47.18 |
| 5,074,576 | 12/1991 | Finlay | 280/645 |
| 5,074,577 | 12/1991 | Kim | 280/646 |
| 5,112,068 | 5/1992 | Liao et al. | 280/30 |
| 5,139,257 | 8/1992 | Wu | 273/32 E |
| 5,152,489 | 10/1992 | Christensen et al. | 248/311.2 |
| 5,180,184 | 1/1993 | Chiu | 280/646 |
| 5,215,194 | 6/1993 | Blanford et al. | 206/315.3 |
| 5,288,099 | 2/1994 | Wu | 280/646 |
| 5,451,072 | 9/1995 | Weng | 280/646 |
| 5,526,894 | 6/1996 | Wang | 180/65.1 |

FOREIGN PATENT DOCUMENTS 162758  9/1948  Australia ................................ 224/29

Primary Examiner—Robert J. Oberleitner
Assistant Examiner—Bridget Avery
Attorney, Agent, or Firm—Morton J. Rosenberg; David I. Klein; Jun Y. Lee

[57] ABSTRACT

A golf trolley is provided which mainly comprises an upper plate, a lower plate, a main tube, and two wheel legs associated with wheels. The upper plate and the lower plate are fitted to the main tube to hold golf clubs and are removable. The wheel legs are pivotally associated with a lower holding block connected to a lower portion of the main tube and are operationally associated with a stopping bar and two leg proppers.

8 Claims, 7 Drawing Sheets

GOLF TROLLEY

BACKGROUND OF THE INVENTION

A heretofore known golf trolley, as shown in FIG. 10, is provided which comprises a trolley 10 and a golf bag 20; the trolley 10 includes an upper curve block 101, a lower curve block 102 and two fastening belts 103, 104 connected to the upper curve block 101, the lower curve block 102 respectively.

The golf bag 20 is able to be attached to, or separated from, the trolley 10; the fastening belts 103, 104 are used to fasten the golf bag 20 to the curve bars 101, 102 of the trolley 10.

An user can pull the trolley 10 together with the golf bag 20 holding gold clubs easily by means of a handle and two wheels (not numbered), however, through use of the golf trolley, the golf bag 20 is known to be prone to separate from the trolley 10 under movement, esp. when it is loaded with a lot of golf clubs and so become heavy.

SUMMARY OF THE INVENTION

The present invention relates to a golf trolley, of which main parts include a main tube, an upper holding block, a lower holding block, a pair of wheel legs, an upper plate, and a lower plate, the upper holding block being connected to both an upper portion of the main tube and the upper plate, the lower plate being connected to a lower portion of the main tube, the lower holding block geing connected to both a lower portion of the main tube and the wheel legs associated with two wheels.

A stopping bar, two leg proppers, and a spring are provided for the wheel legs to be shifted to a pulled, or propped, or shouldered, position depending on need: the stopping bar is pivotally associated with a lower portion of the fixed tube; the spring is connected to both the stopping bar and the lower plate; the leg proppers are pivotally associated with mediate portions of the wheel legs and with a mediate portion of the stopping bar; in said pulled position, the wheel legs are stretched outward to form an angle with the main tube with the detained end of the stopping bar being buckled onto the outward buckle and the leg proppers propping the mediate portion thereof; in said propped position, the stopping bar is pivoted downward, after the golf trolley has been shifted to said pulled position and after the detained end is separated from the outward buckle, up to the ground by means of the spring; in said shouldered position, the wheel legs are withdrawn to get close to the main tube and the stopping bar is pivoted downward up to being substantially parallel to the main tube after the golf trolley is lifted off the ground.

BRIEF DESCRIPTION OF THE DRAWINGS

The present invention will be better understood by reference to the accompanying drawings, wherein.

DESCRIPTION OF THE PREFERRED EMBODIMENTS

Figure 1:
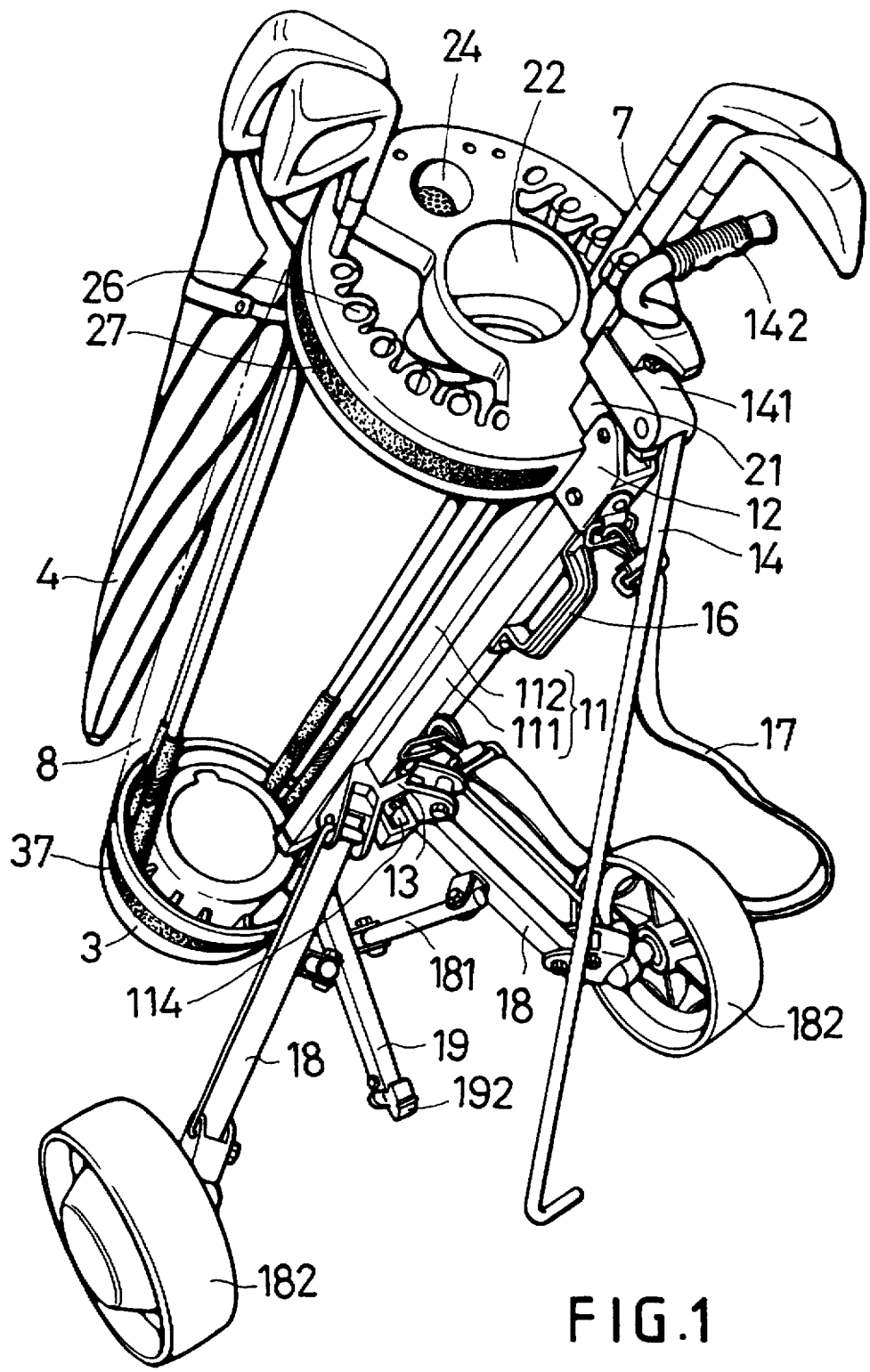
FIG. 1 is a view showing appearance of a golf trolley of the present invention in a propped position.
Figure 2:
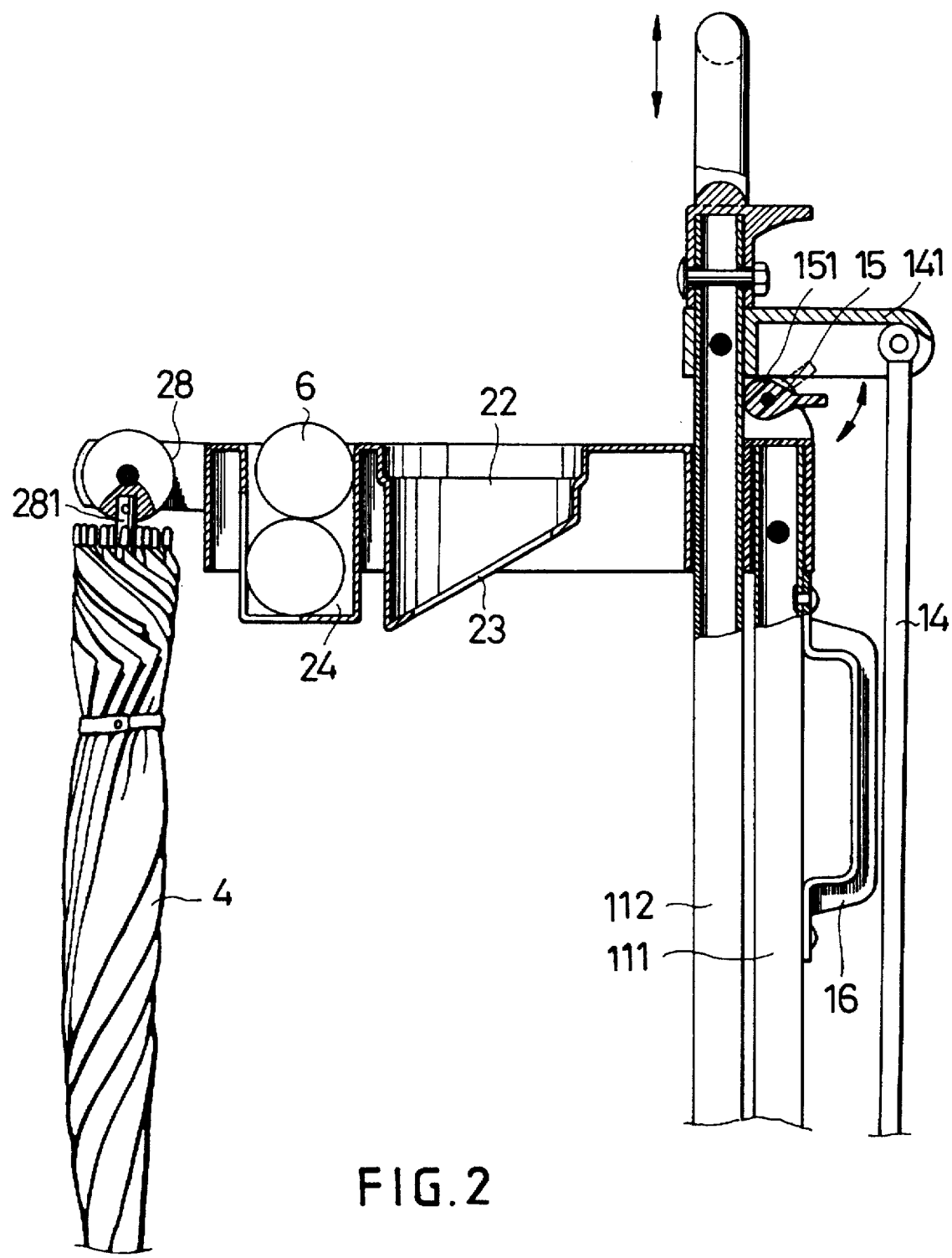
FIG. 2 is a view showing an umbrella and an upper portion of the golf trolley of the present invention.
Figure 3:
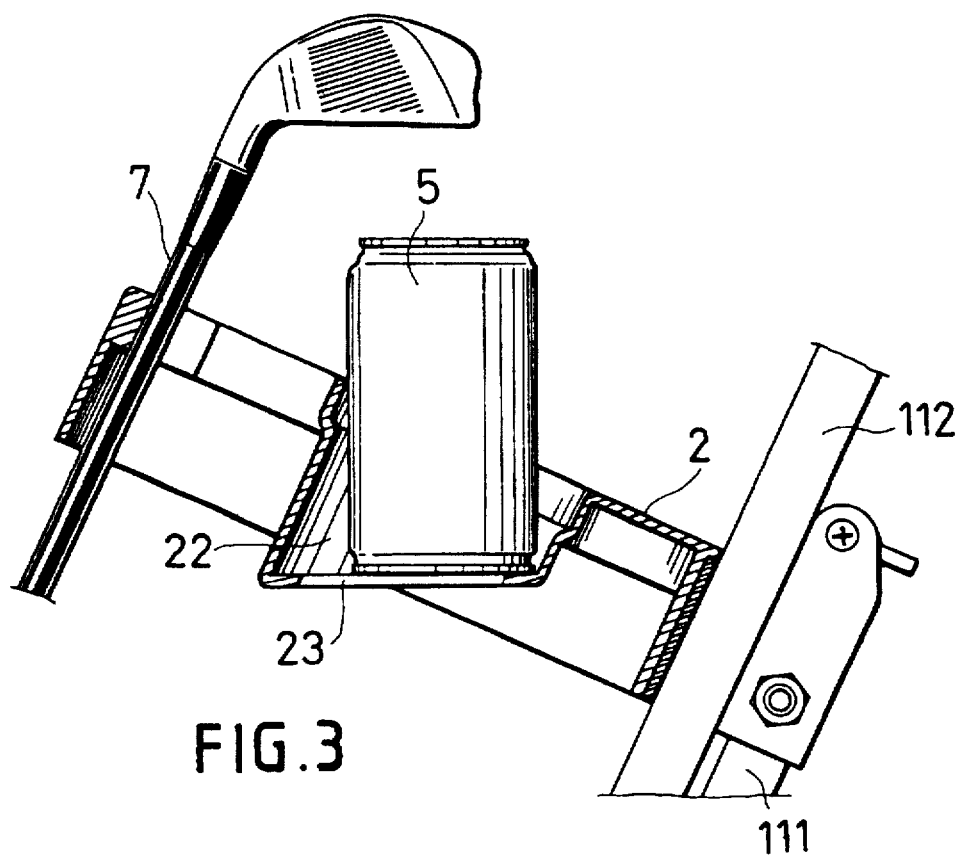
FIG. 3 is a view showing an upper plate of the present invention holding a drink can.
Figure 4:
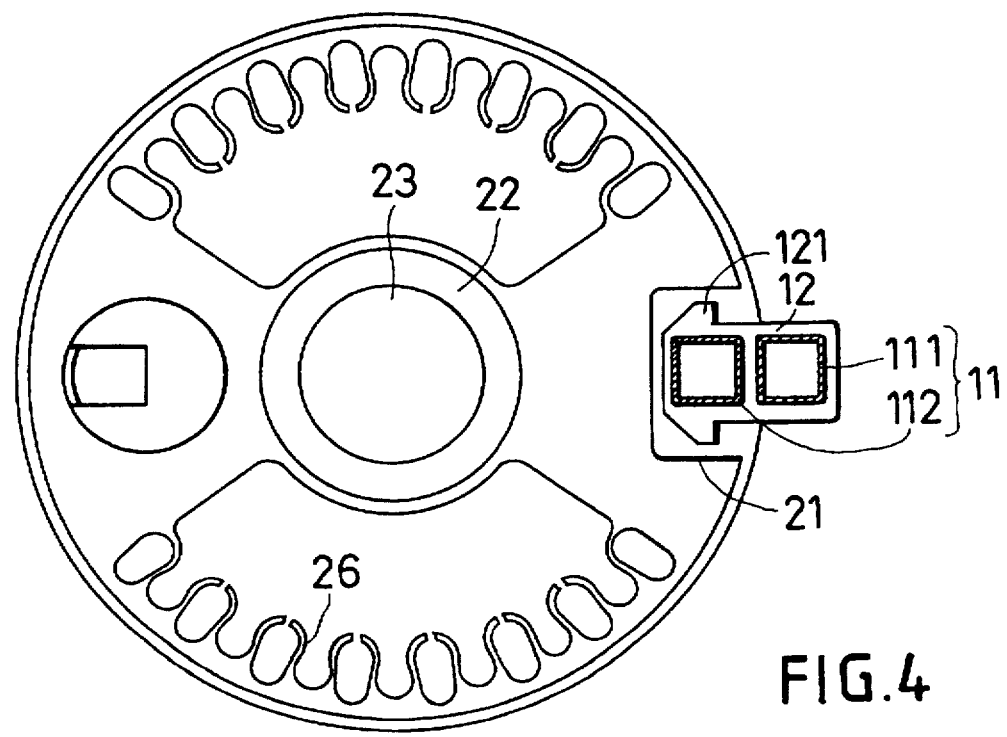
FIG. 4 is a top view of an upper plate connected to a main tube of the present invention.
Figure 5:
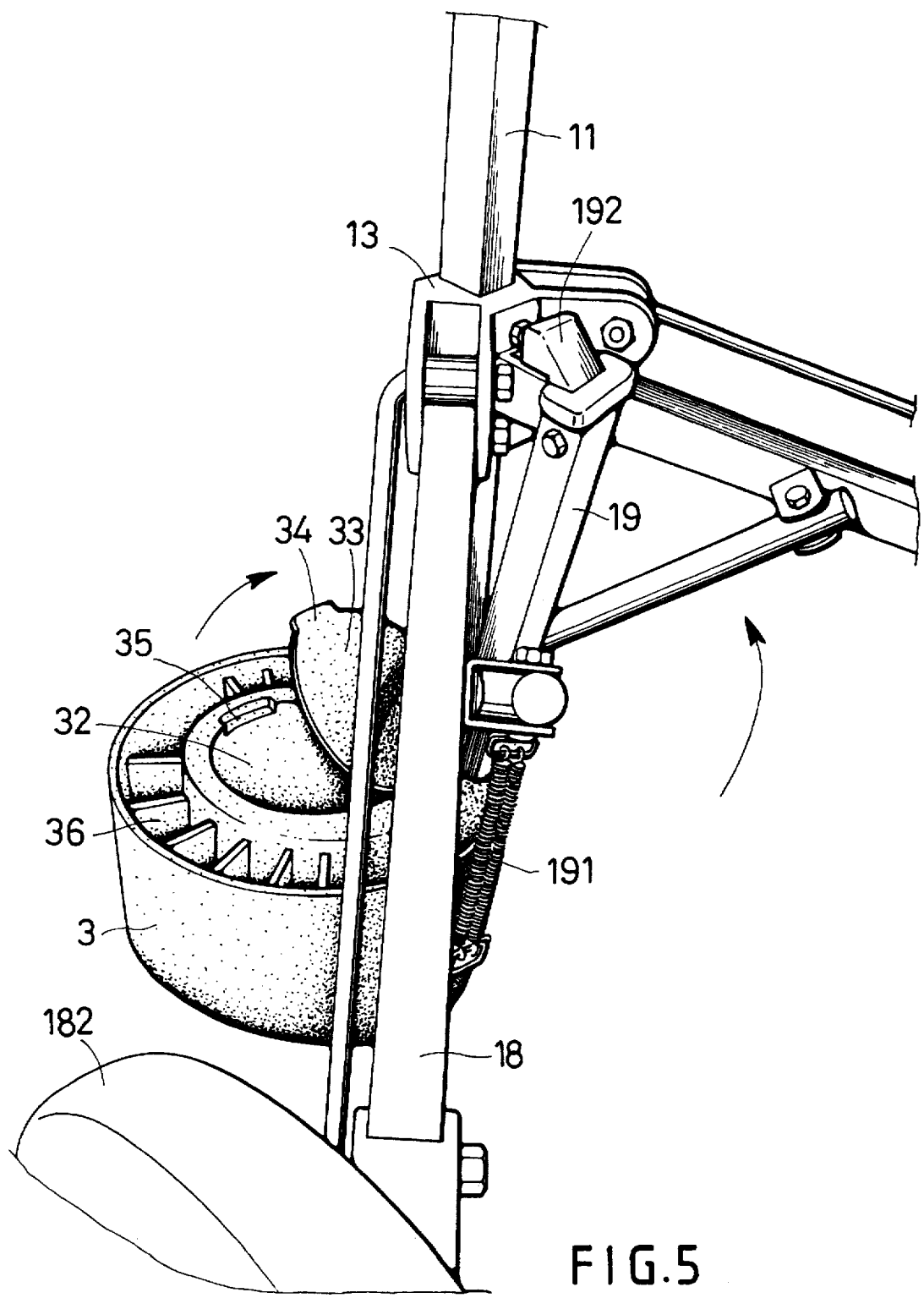
FIG. 5 is view showing a lower plate connected to a lower portion of a main tube of the present invention.
Figure 6:
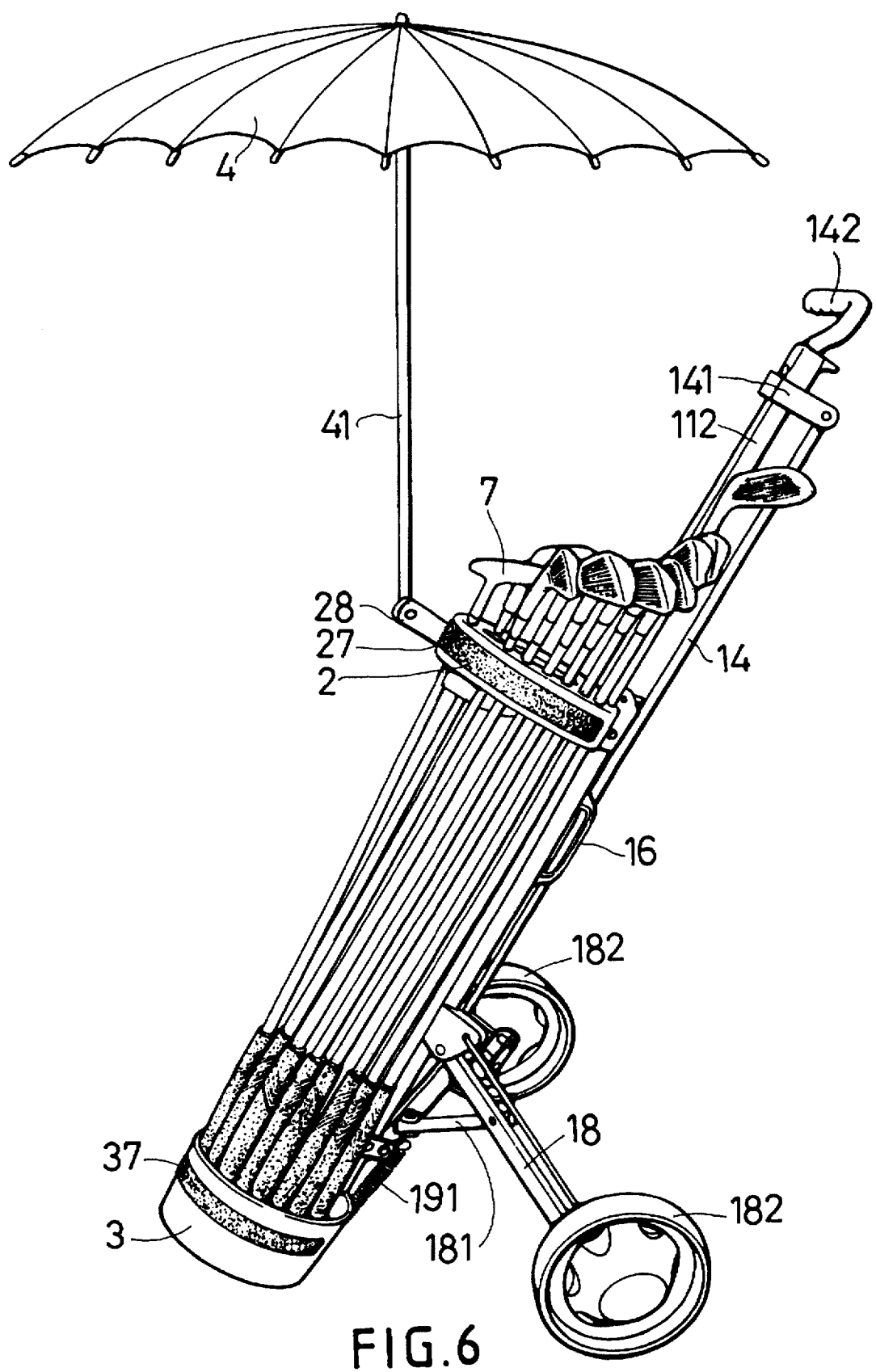
FIG. 6 is a view showing a golf trolley and an opened umbrella of the present invention.
Figure 7:
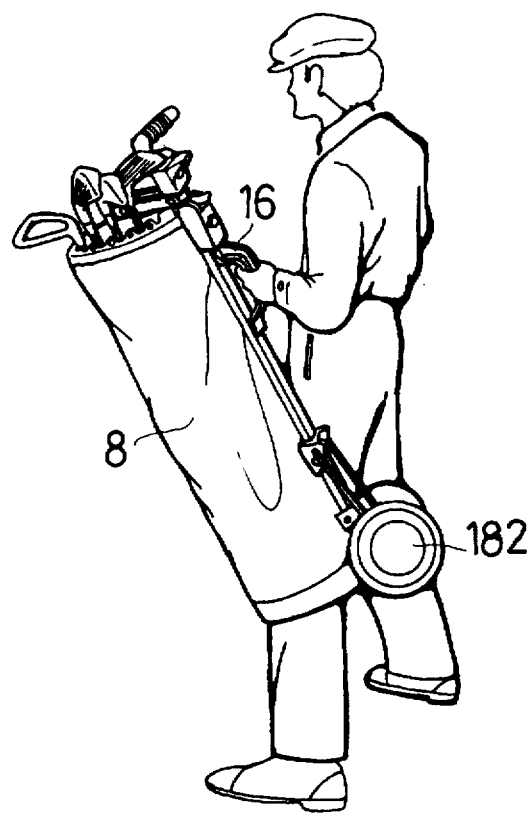
FIG. 7 is a view illustrating movement of an user holding a golf trolley of the present invention at the hand.
Figure 8:
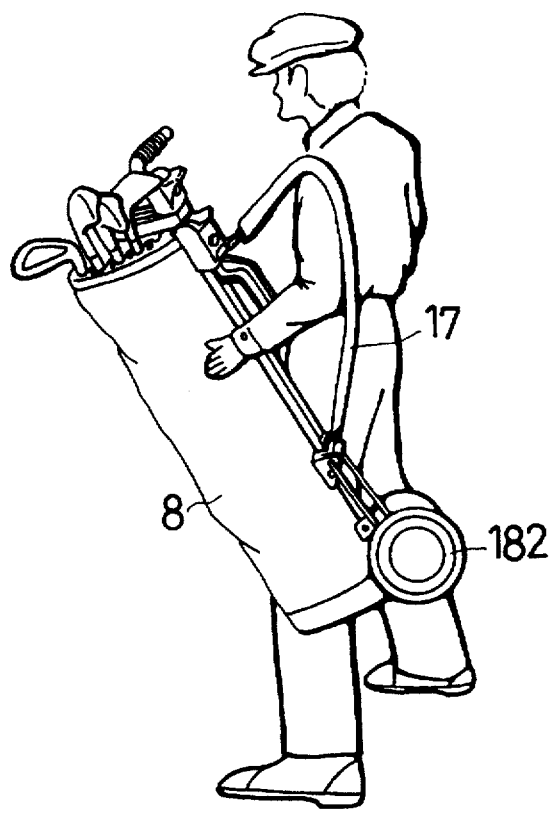
FIG. 8 is a view illustrating movement of an user shouldering a golf trolley of the present invention.
Figure 10:
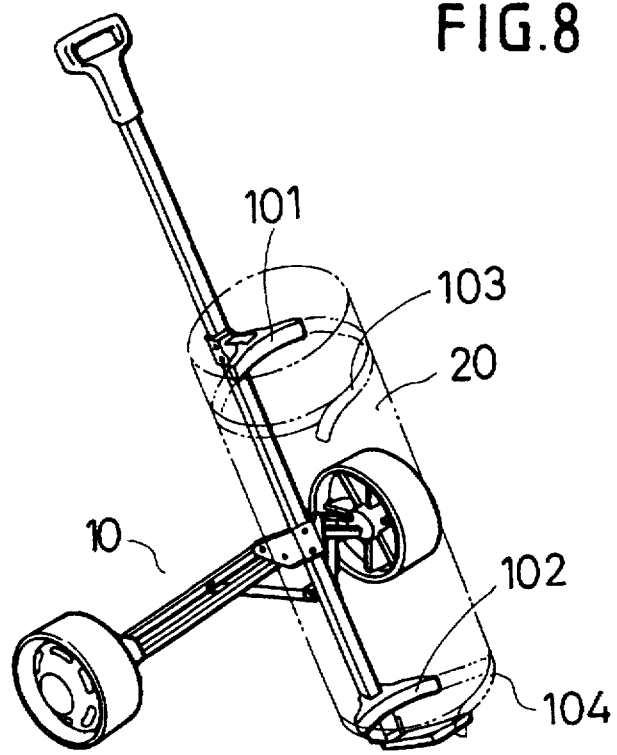
FIG. 10 is a view showing a heretofore known golf trolley as described in BACKGROUND OF THE INVENTION.
Figure 9:
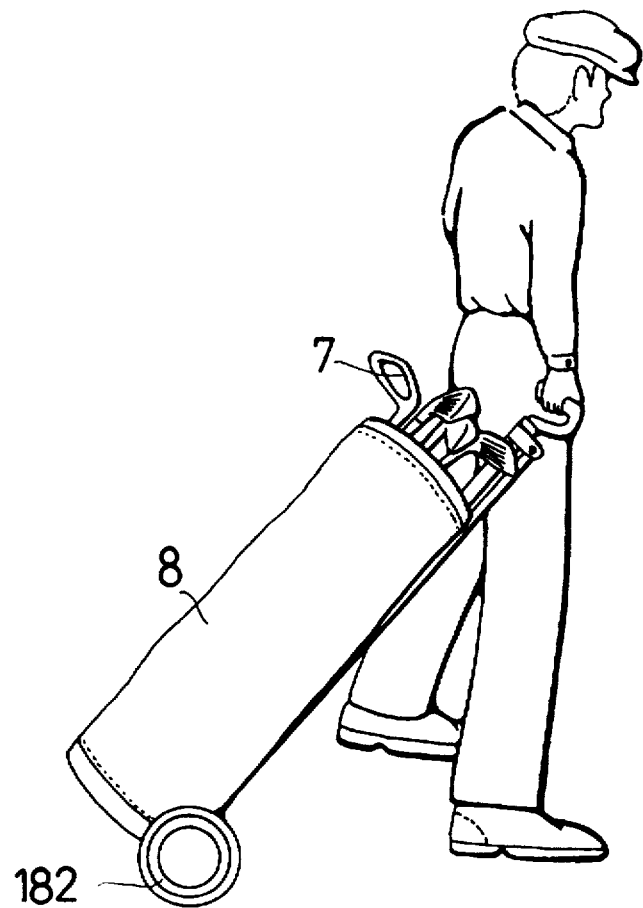
FIG. 9 is a view illustrating movement of an user pulling a golf trolley of the present invention.

A golf trolley of the present invention, referring to FIGS. 1, 6, is provided which comprises an upper plate 2, a lower plate 3, a main tube 11, a pair of wheel legs 18, a pair of wheels 182, a stopping bar 19, an umbrella 4, and a propper 14 as the main parts.

The main tube 11 includes a fixed tube 111, a sliding tube 112 and are connected to an upper holding block 12, and to a lower holding block 13; the upper holding block 12 being unmovably connected to the fixed tube 111 and having both an engaging part 121 shaped as a polygon and a pivot button 15 having a detaining end 151 on an outward side, the lower holding block 12 being unmovably connected to a low portion of the fixed tube 111, a top of the sliding tube 112 being connected with a handle 142 and a propper connector 141, to which said propper 14 being pivotally connected, the sliding tube 112 being able to stretch upward upon pulling the handle 142 for the golf trolley to be pulled by an user holding the handle 142, the pivot button 15 being pivoted to fix the sliding tube 112 in position after the sliding tube 112 is stretched to a proper position.

The upper plate 2 is shaped as a round plate and has an engaging cavity 21, a plurality of golf club chippers 26, a ball holder 24, and a central holder 22, the engaging cavity 21 being shaped as the engaging part 121 of the upper holding block 12, the golf club clippers 26 being arranged on inner circumference of the upper plate 2 and each 26 being formed as a pair of thin slices bent toward each other to hold shanks of golf clubs 7, the ball holder 24 being provided to hold golf balls 6, the central holder 22 having a bottom 23 forming an angle with the upper plate 2 that a drink can be held level when the golf trolley is pulled.

Furthermore, the upper plate 2 has an umbrella connector 28 on an outer circumference thereof, a shank 41 of th umbrella 4 is pivotally connected to the umbrella connector 28 that the umbrella 4 can be shifted between an in-use position and a not-in-use position; in said not-in-use position, the umbrella 4 is withdrawn and pivoted downward to be closed to the golf trolley; in said in-use position, the umbrella 4 is pivoted upward and opened to shade the sun.

The lower plate 3 is connected to a bottom part of the fixed tube 111 and has a mediate cavity 32 for holding things, a plurality of compartments 36 on an inward circumference thereof to hold handles of said golf clubs 7, and an attachment band 37 positioned on outward circumference thereof; a cover 33 is provided to movably cover the mediate cavity 32 and fastened on the mediate cavity 32 by means of both a protrusion 35 of the mediate cavity 32 and a detained end 34 thereof.

The wheel legs 18 are pivotally associated with the lower holding block 13 and comprises a stopping bar 19 pivotally associated with a lower portion of the fixed tube 111, and a pair of leg proppers 181; the wheels 182 are rotatably associated with lower ends of the wheel legs 18; the stopping bar 19 includes a detained end 192 to be buckled onto an outward buckle 114 connected to the lower holding block 13; a spring 191 is connected to both the lower plate 3 and the stopping bar 19; the leg proppers 181 are pivotally associated with mediate portions of the wheel legs 18 at one end and with a mediate portion of the stopping bar 19 at the other end.

Furthermore, a handle 16 is fastened to an upper portion of the fixed tube 111 for holding the golf trolley at a hand of an user and a shoulder strap 17 is fastened to both the upper holding block 1 and a lower portion of the fixed tube 111 for the user to shoulder the golf trolley.

The golf trolley is able to be shifted to a pulled, or a propped, or a shouldered position; in said pulled position, the wheel legs 18 are stretched outward to form an angle with the main tube 11 with the detained end 192 of the stopping bar 19 being buckled onto the outward buckle 114 and the leg proppers 181 propping the mediate portion thereof (see FIG. 6); from the pulled position the stopping bar 19 is pivoted downward into the propped position after the detained end 192 of the stopping bar 19 is released from the outward buckle 114, the detained end 192 being displaced to contact the ground by means of the spring 191, and the propper 14 is also pivoted outward to prop the golf trolley more stably; in said shouldered position, the wheel legs 18 are withdrawn to get close to the main tube 11 and the stopping bar 19 is pivoted upwardly to be substantially parallel to the main tube 11 after the golf trolley is lifted off the ground.

An attachable cover 8, which has two attachment areas (not shown), is provided to cover a room between the upper plate 2 and the lower plate 3 by means of attaching said attachment areas to the attachment bands 37 of the upper plate 2 and the lower plate 3.

In using the golf trolley, the golf clubs 7 are kept upside down inside the upper and lower plates 2, 3 with the shanks thereof being snapped into the golf club clippers 26 and the handles positioned inside the compartments 36.

From the above described, it can be understood the golf trolley has achieved functions as follows:

1. using the attachment bands 37 and the attachable cover 8, the user can remove the attachable cover 8 easily according to need;
2. using engagement of the upper and lower plates 2, 3 with the main tubes 11, the golf trolley is easy to disassemble;
3. providing the umbrella 4 to shade the sun;
4. providing the central holder 22 to hold a drink can;
5. providing the ball holder 24 to hold golf balls;
6. providing the handle 16 for the user to lift, and carry, the golf trolley;
7. providing the shoulder strap 17 for the user to shoulder the golf trolley;
8. providing the mediate cavity 32 for holding personal stuff such as keys;
9. providing the wheel legs 18 which can be withdrawn when the golf trolley is shouldered or lifted to carry;
10. providing the stepping bar 19 which can be pivoted according to need; i.e. to pull, or to prop, or to shoulder, the golf trolley; and,
11. providing the propper 14 to prop the golf trolley more stably.

While preferred embodiments of the invention have been described above, it will be recognized and understood that various that various modifications may be made therein and the appended claims are intended to cover all such modifications which may fall within the spirit and scope of the invention.

What is claimed is:

1. A golf trolley, comprising a main tube, an upper holding block, a lower holding block, a pair of wheel legs, an upper plate, and a lower plate, the upper holding block being connected to both an upper portion of the main tube and the upper plate, the lower plate being connected to a lower portion of the main tube, the lower holding block being connected to both a lower portion of the main tube and the wheel legs, the upper holding block having a pivot button pivotally coupled thereto, the pivot button having a detaining end formed thereon for contacting and releasably fixing a position of a sliding tube of the main tube.

2. The golf trolley as claimed in claim 1, wherein the upper plate and the lower plate are removable.

3. The golf trolley as claimed in claim 1, further comprising an umbrella pivotally connected to an outer circumferential edge of the upper plate diametrically opposed to the upper holding block's connection to the upper plate.

4. The golf trolley as claimed in claim 1, further comprising a central holder coupled to the upper plate and having a bottom wall formed at an angle with respect to said upper plate to hold a drink can in a substantially level orientation as the golf trolley is pulled by a user.

5. The golf trolley as claimed in claim 1, further comprising a shoulder strap coupled on one end thereof to the upper holding block and on an opposing end to the main tube at a location longitudinally spaced from the upper holding block for a user to shoulder the golf trolley.

6. The golf trolley as claimed in claim 1, further comprising an outwardly extending buckle coupled to the lower holding block and a stopping bar having a distal end releasably fastened to the buckle when the golf trolley is shifted to a pulled position.

7. The golf trolley as claimed in claim 6, further comprising a propper connected to a top portion of the main tube and being outwardly displaceable to prop the golf trolley in a propped position.

8. A golf trolley, comprising a main tube, an upper holding block, a lower holding block, a pair of wheel legs, an upper plate, and a lower plate, the upper holding block being connected to both an upper portion of the main tube and the upper plate, the lower plate being connected to a lower portion of the main tube, the lower holding block being connected to both a lower portion of the main tube and the wheel legs, a stopping bar, two leg proppers, and a spring being provided for selectively shifting the wheel legs to a pulled, or propped, or shouldered position, the stopping bar being pivotally coupled to a lower portion of the main tube; the spring being connected on one end thereof to the stopping bar and on an opposing end to the lower plate; each of the two leg proppers having one end pivotally coupled to a mediate portion of a respective one of the pair of wheel legs and an opposing end pivotally coupled to a mediate portion of the stopping bar; wherein, the wheel legs are stretched outward to form an angle with respect to the main tube with a distal end of the stopping bar being fastened onto an outwardly extending buckle coupled to the lower holding block and the leg proppers propping the mediate portion thereof in the pulled position; from the pulled position, the stopping bar is unfastened from the buckle and pivoted downwardly to a ground surface by the spring; the wheel legs being withdrawn to a position close to the main tube and the stopping bar being pivoted upwardly to a position substantially parallel to the main tube after the golf trolley is lifted off the ground surface.

* * * * *